(12) United States Patent
Wang et al.

(10) Patent No.: US 6,676,328 B2
(45) Date of Patent: Jan. 13, 2004

(54) SIMPLIFIED FASTENING MEANS

(76) Inventors: Shyh-Jen Wang, No. 201, Shih-Pai Road, Sec, 2 (Attn. Experiment Surgery), Taipei (TW); Mig-Ren Lin, No. 3, Lane 86, Hot-spring Street, Wu-Lai, Taipei Hsien (TW)

( * ) Notice: Subject to any disclaimer, the term of this patent is extended or adjusted under 35 U.S.C. 154(b) by 1 day.

(21) Appl. No.: 10/150,611

(22) Filed: May 14, 2002

(65) Prior Publication Data

US 2003/0215284 A1 Nov. 20, 2003

(51) Int. Cl.⁷ ................................................. B62D 1/04
(52) U.S. Cl. ..................................................... 403/374.3
(58) Field of Search .............................. 403/343, 109.5, 403/109.6, 109.4, 109.3, 109.2, 109.1, 259, 374.3, 374.1, 373

(56) References Cited

U.S. PATENT DOCUMENTS 5,277,323 A * 1/1994 Wallace et al. ......... 403/374 X
6,454,486 B2 * 9/2002 Kreuzer ................... 403/374.3

* cited by examiner

Primary Examiner—John R. Cottingham

(57) ABSTRACT

A simplified fastening device includes a holding base slidably engageable with a rod, a thrusting bolt rotatably secured in the holding base, and a pressing block reciprocatively moving in the holding base and operatively propelled by the thrusting bolt to interfere in the rod to quickly, safely, reliably and firmly retain the rod on the holding base.

3 Claims, 3 Drawing Sheets

SIMPLIFIED FASTENING MEANS

BACKGROUND OF THE INVENTION

A fastening means, as early filed by the same inventors of this application and given with an application number of: Ser. No. 09/800,235, includes: a holding base capable of sliding or rotating on a rod, a driving bolt rotatably coupled with a thrusting block rotatably engaged in the holding base having a driving wedge face formed on the thrusting block, and a follower block movably reciprocating in the holding base having a follower wedge face formed on the follower block and tangentially engageable with the driving wedge face of the thrusting block; whereby upon a rotation of the driving bolt to inwardly push the thrusting block in the holding base, the follower block will be thrusted by the driving block to interfere in a rod surface for quickly, ergonomically and firmly fastening the rod within the holding base.

However, such a fastening device (prior art) still requires more elements to construct the device, thereby increasing the production complexity and maintenance problem.

The present inventor has found the drawbacks of the prior art and invented the present fastening means with simplified structure and decreased elements.

SUMMARY OF THE INVENTION

The object of the present invention is to provide a fastening device with less elements and simpler structure for saving manufacturing cost for better operation and maintenance.

Another object of the present invention is to provide a simplified fastening device including a holding base slidably engageable with a rod, a thrusting bolt rotatably secured in the holding base, and a pressing block reciprocatively moving in the holding base and operatively propelled by the thrusting bolt to interfere in the rod to quickly, safely, reliably and firmly retain the rod on the holding base.

Still another object of the present invention is to provide a slopping engagement between the pressing block and the thrusting bolt based on the principle of mechanical wedge (serving as "toggle-like mechanism") to enlarge the engagement force, thereby requiring only a smaller driving force to perform the fastening action.

DETAILED DESCRIPTION

Figure 1:
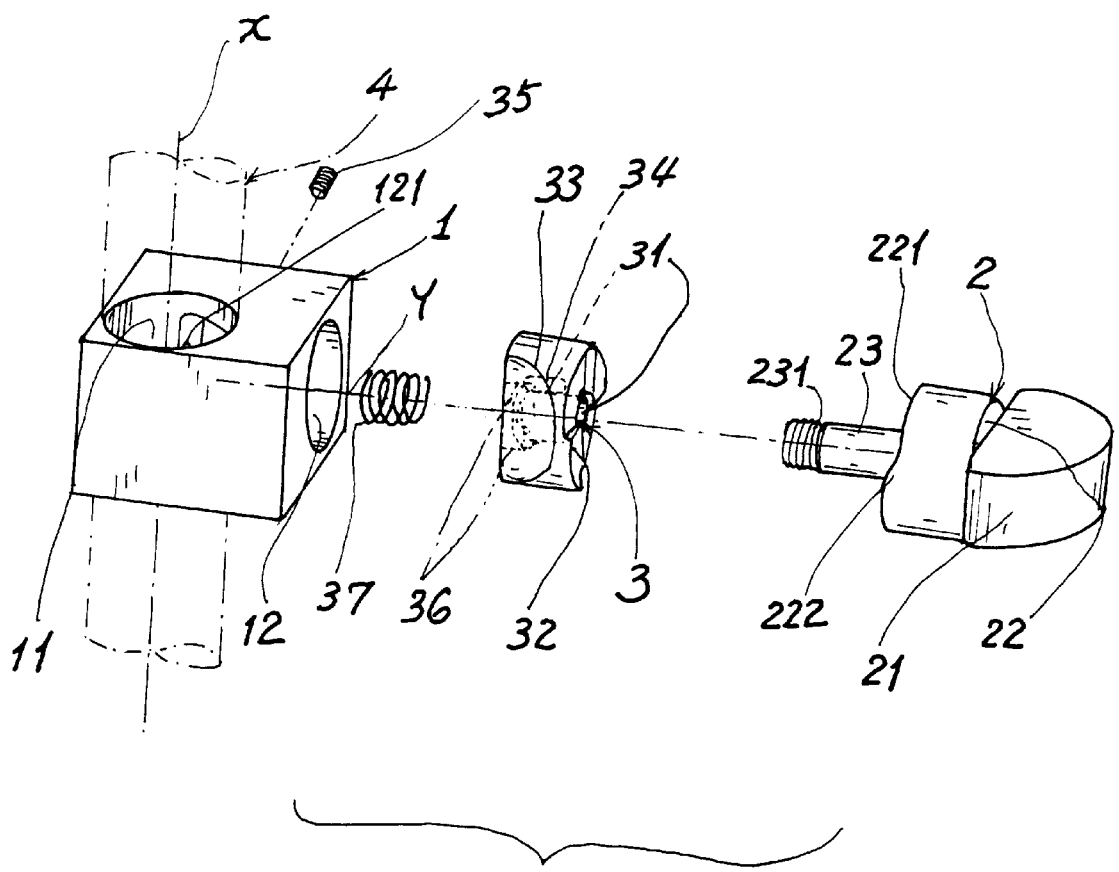
FIG. 1 is an exploded view of the present invention.
Figure 2:
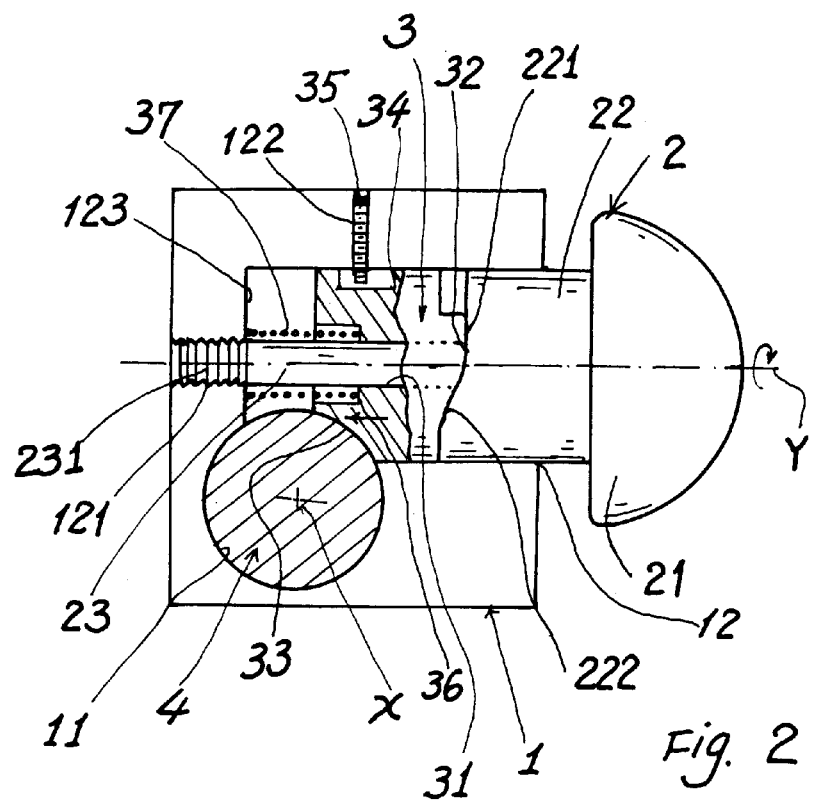
FIG. 2 is a partial sectional drawing of the present invention when assembled.
Figure 3:
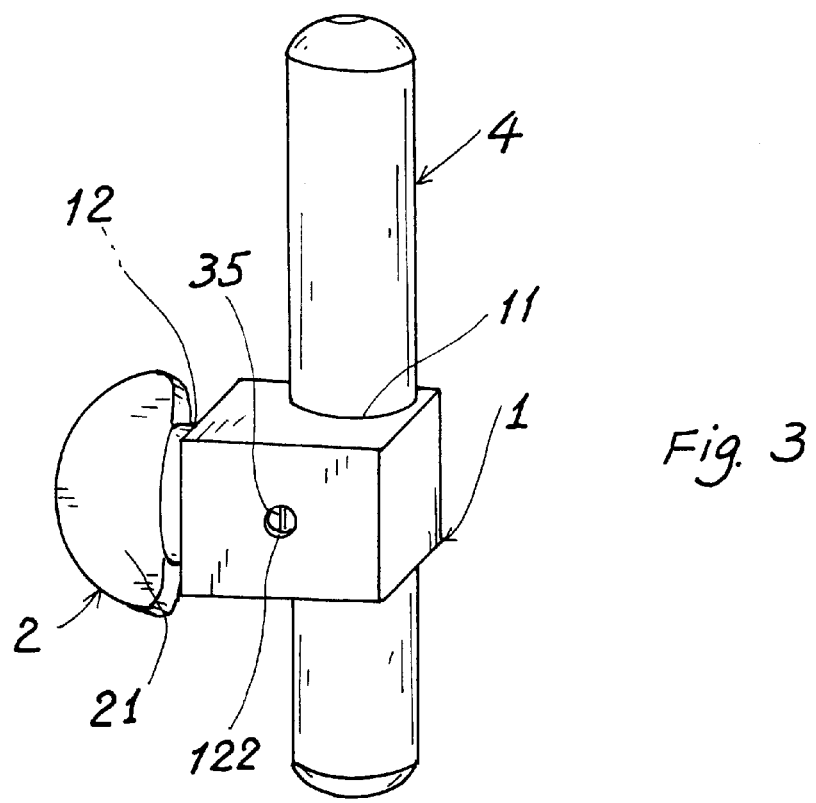
FIG. 3 is a perspective view of the present invention when assembled.

As shown in FIGS. 1~3, the simplified fastening means of the present invention comprises: a holding base 1 slidably engageable with a rod (or column) 4; a thrusting bolt 2 rotatably secured in the holding base 1; and a pressing block 3 reciprocatively moving in the holding base 1 and operatively propelled by the thrusting bolt 2 to interfere in and firmly fasten the rod 4 on the holding base 1.

The rod 4 may be referred to a rod member, a bar, a column or any rod-like fixture preferably formed as cylindrical shape. The holding base 1 may be integrally formed with or detachably mounted on a fixed object, a platform or any fixtures.

The holding base 1 includes: a rod hole 11 longitudinally formed in the holding base 1 defining a longitudinal axis X at the center of the rod hole 11 and slidably or rotatably engageable with the rod 4, a cam hole 12 transversely formed in the holding base 1 about a latitudinal axis Y defined at a center of the cam hole 12 and projectively perpendicular to the longitudinal axis X, and a screw hole 121 formed in the holding base 1 having a diameter smaller than that of the cam hole 12 and coaxially communicated with the bolt hole 12 about the latitudinal axis Y.

The thrusting bolt 2 includes: a handle (or knob) 21, a cylindrical shank portion 22 connected with the handle 21 and rotatably engageable with the cam hole 12 in the holding base 1, a cam portion 221 formed on an inner end portion of the shank portion 22 having at least a thrusting sloping portion 222 concentrically formed on the cam portion 221 for operatively engaging and propelling the pressing block 3 inwardly for fastening the rod 4 between the holding base 1 and the pressing block 3 of the fastening means of the present invention, and a screw portion 23 having male threads 231 formed on the screw portion 23 and engaging with the screw hole 121 formed in the holding base 1, with the screw portion 23 protruding inwardly from the shank portion 22 to pass through the pressing block 3 to be engaged with the screw hole 121 in the holding base 1.

The pressing block 3 includes: a central hole 31 formed through the pressing block 3 for passing the screw portion 23 of the thrusting bolt 2 through the central hole 31, at least a follower sloping portion 32 concentrically formed on an outer end portion of the pressing block 3 to be tangentially engaged with and inwardly propelled by the thrusting sloping portion 222 formed on the thrusting bolt 2, a recess portion 33 arcuately recessed in an inner end portion of the pressing block 3 opposite to the follower sloping portion 32 and engageable with the cylindrical (arcuate) surface of the rod 3 (FIG. 2) in order to interfere in and to firmly fasten the rod 4, a groove 34 longitudinally recessed in a side portion of the pressing block 3 and slidably engaging with a guiding screw 35 inserted through a screw hole 122 in the holding base 1 for longitudinally guiding a reciprocal movement of the pressing block 3 in the cam hole 12 when driven or actuated by the thrusting bolt 2, and a socket 36 recessed in an inner central portion of the pressing block 3 to be coaxially aligned with the central hole 31 of the pressing block 3 for retaining a restoring spring 37 in between the socket 36 and a seat portion 123 formed in the holding base 4 adjacent to the screw hole 121 for tensioning the pressing block 3 to be resiliently coupled with the thrusting bolt 2.

A packing layer (not shown) may be coated on the recess portion 33 of the pressing member 3 to increase a frictional contact between the rod 4 and the block 3 for firmly fastening the rod in the base 1. The packing layer may be made of rubber or other elastomers.

When fastening the rod 4 by the present invention, the handle 21 of the thrusting bolt 2 is rotated about the axis Y (FIG. 2) to engage the thrusting sloping portion 222 of the bolt 2 with the follower sloping portion 32 of the pressing block 3 to propel the pressing block 3 inwardly to allow the recess portion 33 of the block 3 to interfere in the rod 4 for firmly fastening the rod 4 in between the block 3 and the holding base 1 of the present invention. The screw 35 serves to guide an axial forward moving of the block 3 as driven by the bolt 2. The spring 37 forces the block 3 coupling with the bolt 2, so that the follower sloping portion 32 of the block 3 can engage with the thrusting sloping portion 222 of the bolt 2 for accelerating the fastening operation.

Upon a reverse rotation of the handle 21 to uncouple the thrusting portion 222 of the bolt 2 from the follower portion 32 of the block 3, the restoring spring 37 will force the block 3 to disengage from the rod 4 and then to release from the rod 4. With the restoring spring 37 forcing the block 3 towards the bolt 2, the fastening means of the present invention certainly can disengage from the rod 4 very quickly.

With engagement of the screw portion 231 in the screw hole 121 in an axial direction (Y), the block 3 can not be rotated but transversely moved as limited by the screw 35 in the longitudinal groove 34, while the spring 37 forces the block 3 to be engaged with the bolt 2 so that the steps 224 prevent the bolt 2 from being rotated in opposite direction, thereby preventing the bolt 2 from being loosened or released from the holding base 1.

Accordingly, this application is superior to the prior art with the following advantages:

1. The bolt 2 is operated to directly drive the pressing block 3 in order to interfere in the rod 4 so that the mechanism and structure of the fastening device is simplified, by comparing with the conventional devices, for saving cost and for facilitating the operation and maintenance.
2. The restoring spring 37 forces the block 3 coupling with the bolt 2, thereby being helpful for a quicker inward fastening operation or a quicker backward releasing operation.
3. The restoring spring 37 forces the block 3 to be engaged with the bolt 2, thereby preventing the bolt 2 from being loosened or released from the holding base 1.
4. Based on the principle of mechanical wedge to increase the action force, the thrusting slopping portion 222 of the bolt 2 engages with the follower slopping portion 32 of the pressing block 3, thereby ergonomically and firmly fastening the rod within the holding base.

Figure 4:
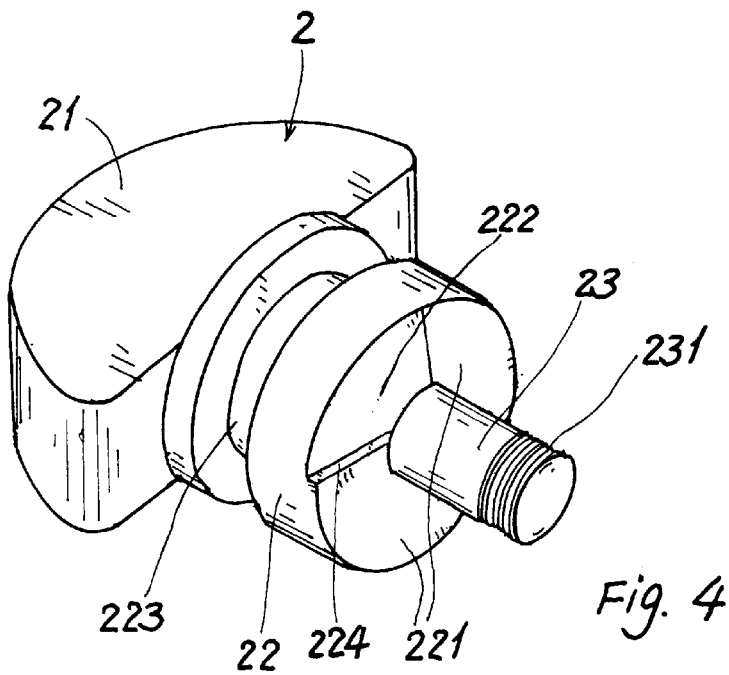
FIG. 4 shows another preferred embodiment of the thrusting bolt of the present invention.
Figure 5:
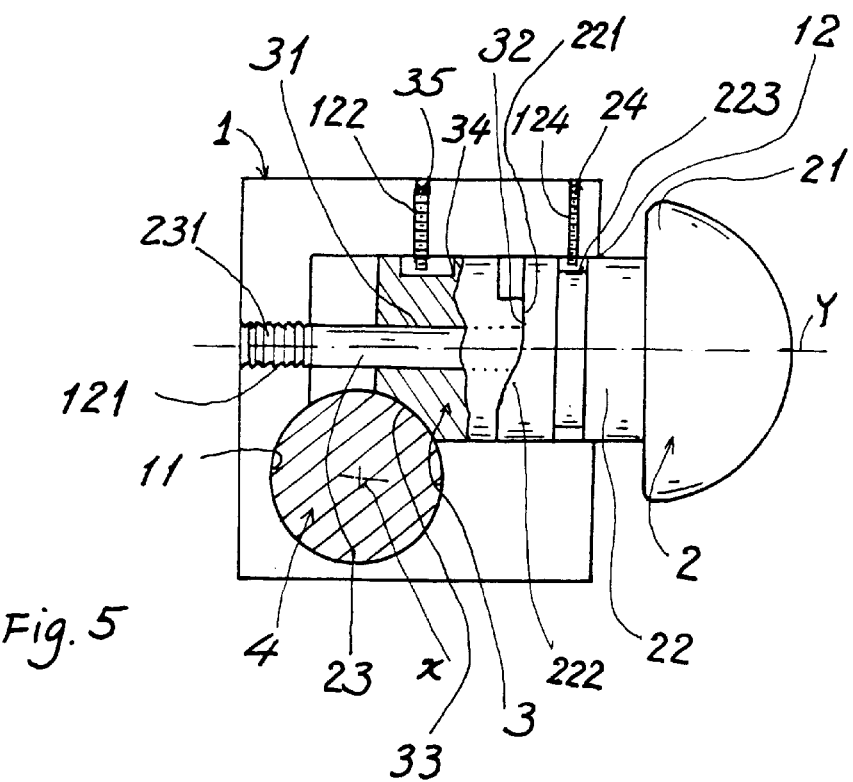
FIG. 5 is a partial sectional drawing of the present invention by incorporating the thrusting bolt as shown in FIG. 4 in the fastening device.

Another preferred embodiment of the present invention is shown in FIGS. 4 and 5, in which the shank portion 22 is annularly recessed with a neck portion 223 to be limited by a limiting screw 24 inserted through a screw hole 124 formed in the holding base 1. The restoring spring 37 as aforementioned may now be eliminated. As being limited by the screw 24, the bolt 2 will be retarded without being released from the holding base 1 unexpectedly, and will be able to be rotated as well as transversely moved forward and backward.

The present invention may be modified without departing from the spirit and scope of the present invention.

We claim:

1. A simplified fastening means comprising:
    a holding base slidably engageable with a rod; said holding base including: a rod hole longitudinally formed in the holding base defining a longitudinal axis at a center of the rod hole and slidably or rotatably engageable with the rod, a cam hole slidably or rotatably engageable with the rod, a cam hole transversely formed in the holding base about a latitudinal axis defined at a center of the bolt hole and projectively perpendicular to the longitudinal axis, and a screw hole formed in the holding base having a diameter smaller than that of the bolt hole and coaxially communicated with the cam hole about the latitudinal axis; said cam hole rotatably engaging with said thrusting bolt and said pressing block in said bolt hole;
    a thrusting bolt rotatably secured in the holding base; said thrusting bolt including: a handle, a cylindrical shank portion connected with the handle and rotatably engageable with the cam hole in the holding base, a cam portion formed on an inner end portion of the shank portion having at least a thrusting sloping portion concentrically formed on the cam portion for operatively engaging and propelling the pressing block inwardly for fastening the rod between the holding base and the pressing block, and a screw portion having male threads formed on the screw portion and engaging with the screw hole formed in the holding base, with the screw portion protruding inwardly from the shank portion to pass through the pressing block to be engaged with the screw hole in the holding base;
    and a pressing block reciprocatively moving in the holding base and propelled by the thrusting bolt to fasten the holding base on the rod; said pressing block including: a central hole formed through the pressing block for passing the screw portion of the thrusting bolt through the central hole, at least a follower sloping portion concentrically formed on an outer end portion of the pressing block to be tangentially engaged with and inwardly propelled by the thrusting sloping portion formed on the thrusting bolt, a recess portion arcuately recessed in an inner end portion of the pressing block opposite to the follower sloping portion and engageable with a cylindrical surface of the rod in order to interfere in and to firmly fasten the rod between the block and the holding base, and a groove longitudinally recessed in a side portion of the pressing block and slidably engaging with a guiding screw inserted through the holding base for longitudinally guiding a reciprocal movement of the pressing block in the bolt hole when driven by the thrusting bolt.

2. A fastening means according to claim 1, wherein said pressing block further includes: a socket recessed in an inner central portion of the pressing block to be coaxially aligned with the central hole of the pressing block for retaining a restoring spring in between the socket and a seat portion formed in the holding base for tensioning the pressing block to be resiliently coupled with the thrusting bolt.

3. A fastening means according to claim 1, wherein said thrusting bolt includes said cylindrical shank portion annularly formed with a neck portion in said shank portion to be rotatably limited by a limiting screw inserted through the holding base.

* * * * *